United States Patent
Kokado

(10) Patent No.: US 12,181,167 B2
(45) Date of Patent: Dec. 31, 2024

(54) AIR CONDITIONING SYSTEM AND CONTROL METHOD FOR THE SAME

(71) Applicant: Panasonic Intellectual Property Management Co., Ltd., Osaka (JP)

(72) Inventor: Takeshi Kokado, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 474 days.

(21) Appl. No.: 17/620,609

(22) PCT Filed: Jun. 4, 2020

(86) PCT No.: PCT/JP2020/022209
§ 371 (c)(1),
(2) Date: Dec. 17, 2021

(87) PCT Pub. No.: WO2020/261928
PCT Pub. Date: Dec. 30, 2020

(65) Prior Publication Data
US 2022/0341620 A1    Oct. 27, 2022

(30) Foreign Application Priority Data
Jun. 28, 2019   (JP) .................................. 2019-122187

(51) Int. Cl.
*F24F 11/74* (2018.01)
*F24F 1/0073* (2019.01)
*F24F 7/003* (2021.01)

(52) U.S. Cl.
CPC ............ *F24F 11/74* (2018.01); *F24F 1/0073* (2019.02); *F24F 7/003* (2021.01)

(58) Field of Classification Search
CPC .......... F24F 11/74; F24F 1/0073; F24F 7/003
See application file for complete search history.

(56) References Cited

U.S. PATENT DOCUMENTS

| 9,109,981 | B2* | 8/2015 | Sharp | F24F 11/74 |
| 2019/0234631 | A1* | 8/2019 | Wallace | B01L 1/04 |
| 2021/0048208 | A1* | 2/2021 | Moffitt | F24F 11/30 |
| 2022/0026101 | A1* | 1/2022 | Ko | F24F 11/88 |

FOREIGN PATENT DOCUMENTS

| JP | 2000-055448 A | 2/2000 |
| JP | 2016-109410 A | 6/2016 |

OTHER PUBLICATIONS

International Search Report issued in corresponding International Patent Application No. PCT/JP2020/022209, dated Aug. 25, 2020, with English translation.

* cited by examiner

*Primary Examiner* — Avinash A Savani
*Assistant Examiner* — Dana K Tighe
(74) *Attorney, Agent, or Firm* — Rimon P.C.

(57) ABSTRACT

A method of controlling a central air conditioning system includes, when a first air volume determined based on humidity in each of a plurality of rooms is less than a second air volume determined based on air quality in the room, causing a conveyor to convey air with a second air volume determined for a first room to the first room and convey air with a third air volume to a second room other than the first room, the third air volume being obtained by correcting the first air volume determined for the second room.

11 Claims, 11 Drawing Sheets

AIR CONDITIONING SYSTEM AND CONTROL METHOD FOR THE SAME

CROSS-REFERENCE OF RELATED APPLICATIONS

This application is the U.S. National Phase under 35 U.S.C. § 371 of International Patent Application No. PCT/JP2020/022209, filed on Jun. 4, 2020, which in turn claims the benefit of Japanese Application No. 2019-122187, filed on Jun. 28, 2019, the entire disclosures of which Applications are incorporated by reference herein.

TECHNICAL FIELD

The present invention relates to an air conditioning system and a control method for the same.

BACKGROUND ART

A central air conditioning system for conditioning air in a plurality of rooms with a single air conditioner has been proposed. As such a central air conditioning system, Patent Literature (PTL) 1 discloses a ventilation air conditioning system capable of efficient air conditioning in each room.

CITATION LIST

Patent Literature

[PTL 1]
Japanese Unexamined Patent Application Publication No. 2016-109410

SUMMARY OF INVENTION

Technical Problem

The aforementioned ventilation air conditioning system is a system tailored to temperature control and is incapable of controlling air quality such as the concentration of carbon dioxide or the concentration of fine particles in a room.

The present invention provides an air conditioning system and a control method for the same that are capable of achieving both temperature control and air quality control.

Solution to Problem

A method of controlling an air conditioning system according to one aspect of the present invention is a method of controlling an air conditioning system that includes an air conditioner, and a conveyor that conveys air that has undergone temperature control by the air conditioner, to each of a plurality of rooms in a facility. The method includes determining a first air volume for each of the plurality of rooms in accordance with temperature information indicating a temperature of the room, the first air volume being a volume of air to be conveyed to the room in order for the room to satisfy a requirement for temperature, determining a second air volume for each of the plurality of rooms in accordance with air quality information indicating air quality in the room, the second air volume being a volume of air to be conveyed to the room in order for the room to satisfy a requirement for air quality, when the plurality of rooms do not include a first room whose first air volume is less than the second air volume, causing the conveyor to convey air with the first air volume determined for each of the plurality of rooms, to the room, and when the plurality of rooms include the first room, causing the conveyor to (1) convey air with the second air volume determined for the first room, to the first room and (2) convey air with a third air volume to a second room other than the first room and included in the plurality of rooms, the third air volume being obtained by correcting the first air volume determined for the second room.

A method of controlling an air conditioning system according to another aspect of the present invention is a method of controlling an air conditioning system that includes an air conditioner, and a conveyor that conveys air that has undergone temperature control by the air conditioner, to each of a plurality of rooms in a facility. The method includes determining a first air volume for each of the plurality of rooms in accordance with temperature information indicating a temperature of the room, the first air volume being a volume of air to be conveyed to the room in order for the room to satisfy a requirement for temperature, determining a second air volume for each of the plurality of rooms in accordance with air quality information indicating air quality in the room, the second air volume being a volume of air to be conveyed to the room in order for the room to satisfy a requirement for air quality, when a total of the first air volumes is greater than or equal to a total of the second air volumes, causing the conveyor to convey air with the first air volume determined for each of the plurality of rooms, to the room, and when the total of the first air volumes is less than the total of the second air volumes, causing the conveyor to convey air with a third air volume to each of the plurality of rooms, the third air volume being obtained by correcting the first air volume determined for the room.

A recording medium according to one aspect of the present invention is a non-transitory computer-readable recording medium for use in a computer, the recording medium having a computer program recorded thereon for causing the computer to execute the method of controlling an air conditioning system.

An air conditioning system according to one aspect of the present invention includes an air conditioner, a conveyor that conveys air that has undergone temperature control by the air conditioner, to each of a plurality of rooms in a facility, and a control device. The control device determines a first air volume for each of the plurality of rooms in accordance with temperature information indicating a temperature of the room, the first air volume being a volume of air to be conveyed to the room in order for the room to satisfy a requirement for temperature, determines a second air volume for each of the plurality of rooms in accordance with air quality information indicating air quality in the room, the second air volume being a volume of air to be conveyed to the room in order for the room to satisfy a requirement for air quality, when the plurality of rooms do not include a first room whose first air volume is less than the second air volume, causes the conveyor to convey air with the first air volume determined for each of the plurality of rooms to the room, and when the plurality of rooms include the first room, causes the conveyor to (1) convey air with the second air volume determined for the first room to the first room and (2) convey air with a third air volume to a second room other than the first room and included in the plurality of rooms, the third air volume being obtained by correcting the first air volume determined for the second room.

An air conditioning system according to another aspect of the present invention includes an air conditioner, a conveyor that conveys air that has undergone temperature control by the air conditioner, to each of a plurality of rooms in a facility, and a control device. The control device determines a first air volume for each of the plurality of rooms in accordance with temperature information indicating a temperature of the room, the first air volume being a volume of air to be conveyed to the room in order for the room to satisfy a requirement for temperature, determines a second air volume for each of the plurality of rooms in accordance with air quality information indicating air quality in the room, the second air volume being a volume of air to be conveyed to the room in order for the room to satisfy a requirement for air quality, when a total of the first air volumes is greater than or equal to a total of the second air volumes, causes the conveyor to convey air with the first air volume determined for each of the plurality of rooms to the room, and when the total of the first air volumes is less than the total of the second air volume, causes the conveyor to convey air with a third air volume to each of the plurality of rooms, the third air volume being obtained by correcting the first air volume determined for the room.

Advantageous Effects of Invention

The present invention provides an air conditioning system and a control method for the same that are capable of achieving both temperature control and air quality control.

DESCRIPTION OF EMBODIMENTS

An embodiment will be described hereinafter in greater detail with reference to the accompanying drawings. The embodiment described below shows a general or specific example. Numerical values, shapes, materials, constituent elements, the positions and connection of constituent elements in arrangements, steps, the sequence of the steps, etc. shown in the following exemplary embodiment are mere examples, and therefore do not limit the scope of the appended claims and their equivalents. Therefore, among the constituent elements in the following exemplary embodiment, those that are not recited in any of the independent claims are described as optional elements.

Note that each drawing is a schematic diagram and does not necessarily provide precise depiction. Substantially the same constituent elements are given the same reference signs throughout the drawings, and their detailed description may be omitted or simplified.

Embodiment

Configuration of Central Air Conditioning System

Figure 1:
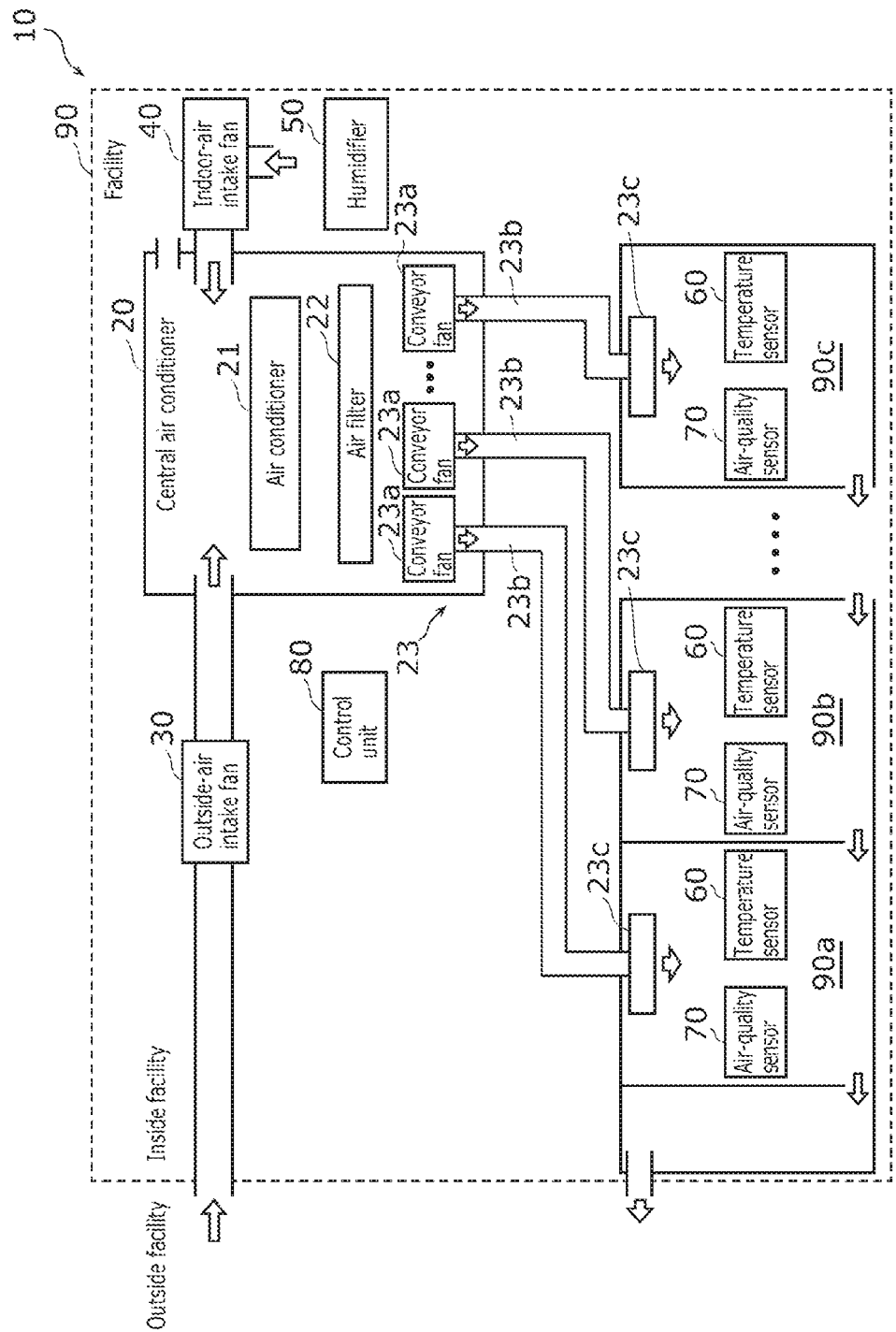
FIG. 1 is a diagram illustrating a schematic configuration of a central air conditioning system according to an embodiment.
Figure 2:
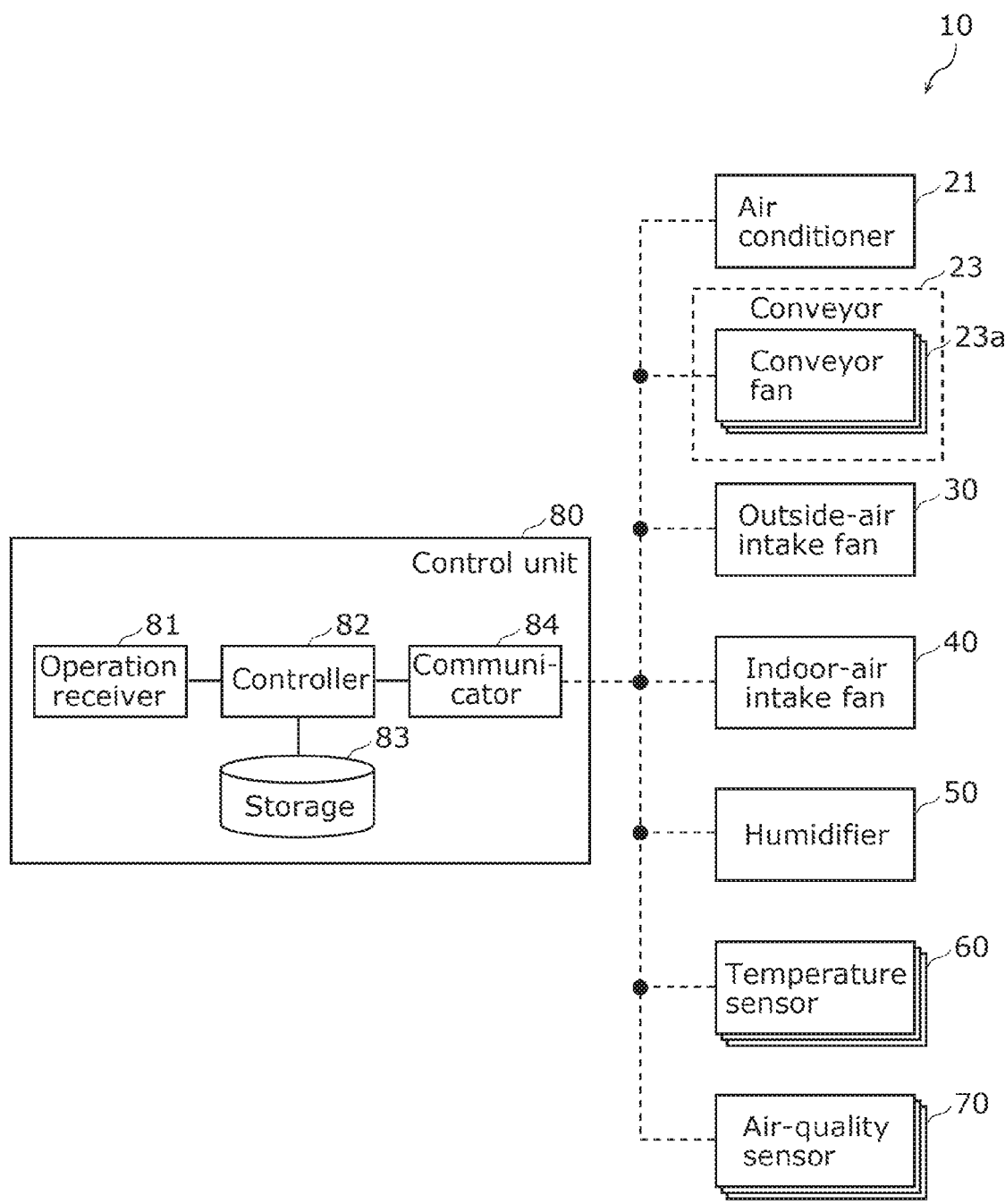
FIG. 2 is a block diagram illustrating a functional configuration of the central air conditioning system according to the embodiment.

Hereinafter, a configuration of a central air conditioning system according to an embodiment will be described. FIG. 1 is a diagram illustrating a schematic configuration of the central air conditioning system according to the embodiment. FIG. 2 is a block diagram illustrating a functional configuration of the central air conditioning system according to the embodiment.

As illustrated in FIGS. 1 and 2, central air conditioning system 10 is a system capable of temperature control in a plurality of rooms 90a to 90c in facility 90, using single air conditioner 21. There are no particular limitations on the number of rooms. Central air conditioning system 10 includes central air conditioner 20, outside-air intake fan 30, indoor-air intake fan 40, humidifier 50, a plurality of temperature sensors 60, a plurality of air-quality sensors 70, and control device 80. Central air conditioner 20, outside-air intake fan 30, indoor-air intake fan 40, humidifier 50, temperature sensors 60, and air-quality sensors 70 each have a function of communicating with control device 80.

Central air conditioner 20 controls temperatures in rooms 90a to 90c by controlling the temperature of air to be taken in from outside or inside facility 90 and conveying the temperature-controlled air to each of rooms 90a to 90c. Central air conditioner 20 includes air conditioner 21, air filter 22, and conveyor 23.

Air conditioner 21 is a so-called air conditioner and controls the temperature of air to be taken in from outside or inside facility 90 under the control of control device 80.

Air filter 22 filters the air (outside air or indoor air) taken into the central air conditioner. One example of air filter 22 is a high efficiency particulate air (HEPA) filter.

Conveyor 23 conveys the air (outside air or indoor air) that has undergone temperature control by air conditioner 21 and that has passed through air filter 22, to each of rooms 90a to 90c under the control of control device 80. Conveyor 23 includes a plurality of conveyor fans 23a, a plurality of ducts 23b, and a plurality of vent holes 23c. Conveyor 23 includes one set of conveyor fan 23a, duct 23b, and vent hole 23c for each room.

Outside-air intake fan 30 takes air outside facility 90 into facility 90 and conveys the air to central air conditioner 20 under the control of control device 80.

Indoor-air intake fan 40 conveys air inside facility 90 (to be more specific, air in the space other than rooms 90a to 90c in facility 90) to central air conditioner 20 under the control of control device 80. The air conveyed to central air conditioner 20 by indoor-air intake fan 40 may have humidity controlled by humidifier 50.

Humidifier 50 raises the humidity in air inside facility 90 (to be more specific, air in the space other than rooms 90a to 90c in facility 90).

Each temperature sensor 60 is provided for each of rooms 90a to 90c and measures the temperature of the room where temperature sensor 60 is provided. Temperature sensors 60 have a communication function and are capable of transmitting temperature data indicating the measured temperatures to control device 80.

Each air quality sensor 70 is provided for each of rooms 90a to 90c and measures the air quality in the room where air-quality sensor 70 is provided. The air quality as used herein refers to air quality other than temperature. Air quality sensors 70 have a communication function and are capable of transmitting air quality data indicating the measured air qualities to control device 80.

For example, air-quality sensors 70 may be carbon-dioxide concentration sensors that measure the concentrations of carbon dioxide in rooms 90a to 90c as air qualities and transmit measured data about the concentrations of carbon dioxide to control device 80. Air quality sensors 70 may also be fine-particle concentration sensors such as particulate-matter (PM) 2.5 concentration sensors that measure the concentrations of particulate substances (hereinafter, also simply referred to as "fine particles"). In this case, air-quality sensors 70 measure the concentrations of fine particles in rooms 90a to 90c as air qualities and transmit measured data about the concentrations of fine particles to control device 80. As another alternative, air-quality sensors 70 may be humidity sensors. In this case, air-quality sensors 70 measure humidities in rooms 90a to 90c as air qualities and transmit measured humidity data to control device 80.

Control device 80 controls central air conditioner 20, outside-air intake fan 30, indoor-air intake fan 40, and humidifier 50. Control device 80 includes operation receiver 81, controller 82, storage 83, and communicator 84.

Operation receiver 81 is a user interface that receives user's operations. For example, operation receiver 81 may be implemented by a touch panel, and may also include hardware buttons in addition to the touch panel. Although not shown, control device 80 may be configured to include a display that is implemented by a display panel such as a liquid crystal panel or an organic electro luminescence (EL) panel. Operation receiver 81 and the display may configure a graphical user interface (GUI).

Controller 82 controls central air conditioner 20, outside-air intake fan 30, indoor-air intake fan 40, and humidifier 50 by causing communicator 84 to transmit control signals. For example, controller 82 may be implemented by a microcomputer, or may be implemented by a processor.

Storage 83 is a storage device that stores control programs to be executed by controller 82 or other data. For example, storage 83 may be implemented by a semiconductor memory or the like.

Communicator 84 is a communication module (communication circuit) for allowing control device 80 to communicate with each of outside-air intake fan 30, indoor-air intake fan 40, humidifier 50, temperature sensors 60, and air-quality sensors 70 via a local communication network. For example, the communication provided by communicator 84 may be a wireless communication, or may be a cable communication. There are no particular limitations on communication standards used for the communication.

Exemplary Operation 1

Figure 3:
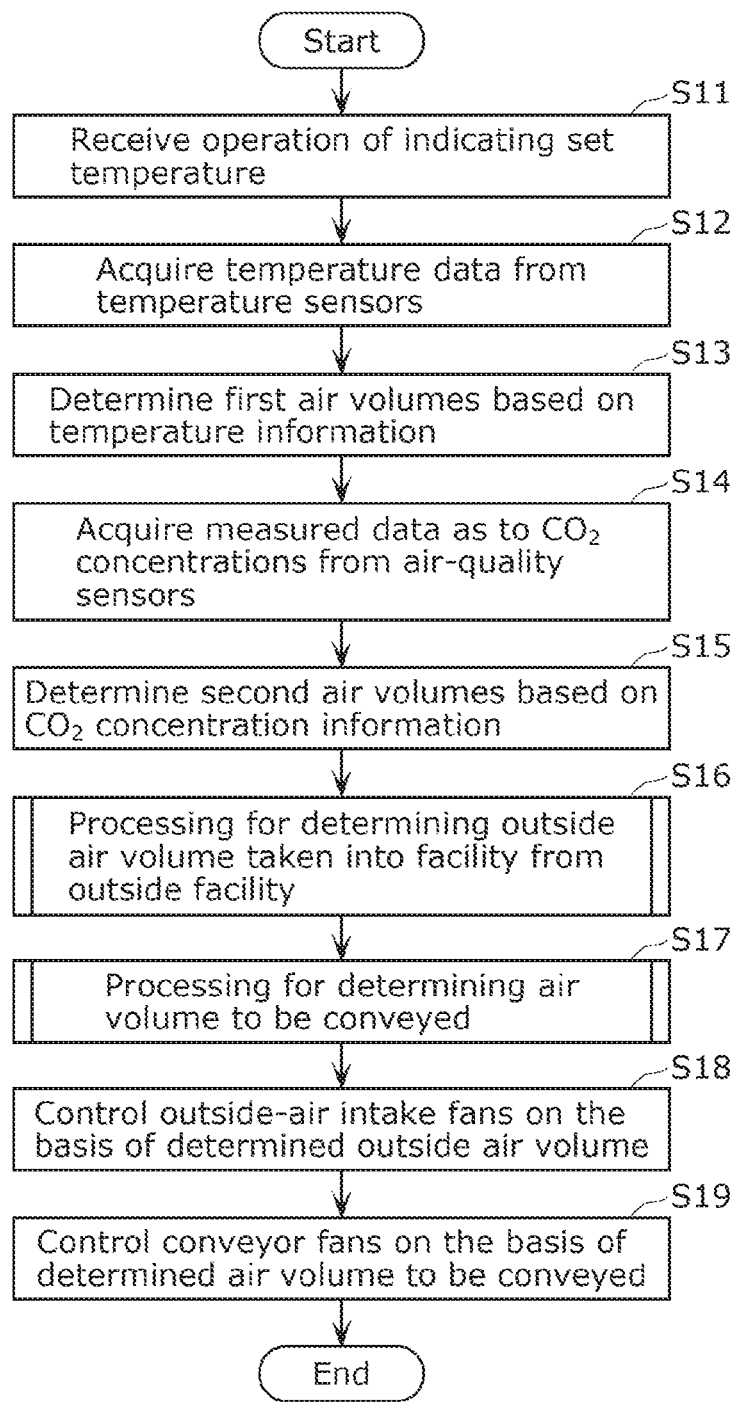
FIG. 3 is a flowchart of Exemplary Operation 1 of the central air conditioning system according to the embodiment.

Next, Exemplary Operation 1 of central air conditioning system 10 will be described. FIG. 3 is a flowchart of Exemplary Operation 1 of central air conditioning system 10. In Exemplary Operation 1, air-quality sensors 70 are carbon-dioxide concentration sensors and use carbon-dioxide concentration information as air quality information. In Exemplary Operation 1, outside-air intake fan 3 is used to take in outside air for the purpose of reducing the concentration of carbon dioxide.

First, operation receiver 81 of control device 80 receives an operation that instructs a set temperature (in other words, target temperature) for each of rooms 90a to 90c (S11). The set temperatures are stored in storage 83.

Then, communicator 84 acquires temperature data indicating the current temperature of each of rooms 90a to 90c from temperature sensor 60 provided in the room. The acquired temperature data is integrated and stored in storage 83 as temperature information indicating the current temperature of each of rooms 90a to 90c.

Then, controller 82 determines a first air volume for each of rooms 90a to 90c in accordance with the temperature information (S13). The first air volume is the volume of air to be conveyed to the room in order for the room to satisfy requirements for temperature (to be more specific, requirements that make the temperature of the room closer to the set temperature).

Controller 82 also determines the volume of airflow and a set temperature to be instructed to air conditioner 21 in accordance with the set temperature and the acquired temperature information. Here, a total of the first air volumes of rooms 90a to 90c is determined so as to become equal to the volume of airflow ejected from air conditioner 21 or to become a value greater than the volume of airflow ejected from air conditioner 21. When the total of the first air volumes of rooms 90a to 90c exceeds the volume of airflow ejected from air conditioner 21, an insufficient amount of air is taken into central air conditioner 20 from an indoor-air intake port in accordance with a difference in pressure and is conveyed to each of rooms 90a to 90c by conveyor 23.

Specifically, controller 82 determines the first air volume for each of rooms 90a to 90c in accordance with room size and a difference between the set temperature and the current temperature of the room. If rooms are the same in size, a room with a greater difference between the set temperature and the current temperature has a greater first air volume. If rooms have the same difference between the set temperature and the current temperature, a larger room has a greater first air volume. For example, an algorithm that is used in already-existing central air conditioning systems may be used to determine the first air volumes. Information indicating the sizes of rooms 90a to 90c is stored in advance in storage 83.

Then, communicator 84 acquires measured data that indicates the current concentration of carbon dioxide in each of rooms 90a to 90c from air-quality sensor 70 (in Exemplary Operation 1, the carbon-dioxide concentration sensor) provided in the room (S14). The acquired measured data is integrated and stored in storage 83 as carbon-dioxide concentration information indicating the current concentration of carbon dioxide in each of rooms 90a to 90c.

Then, controller 82 determines a second air volume for each of rooms 90a to 90c in accordance with the carbon-dioxide concentration information (S15). The second air volume is the volume of air to be conveyed to the room in order for the room to satisfy requirements for the concentration of carbon dioxide (to be more specific, for example, requirements that make the concentration of carbon dioxide in the room lower than a specified concentration). The second air volume can also be said as the volume of outside air (ventilation air volume) that needs to be taken in in order to make the concentration of carbon dioxide in the room lower than the specified concentration.

Specifically, controller 82 determines the second air volume for each of rooms 90a to 90c in accordance with room size and the concentration of carbon dioxide in the room. If rooms are the same in size, a room with a higher concentration of carbon dioxide has a greater second air volume. If rooms have the same concentration of carbon dioxide, a larger room has a greater second air volume.

Figure 4:
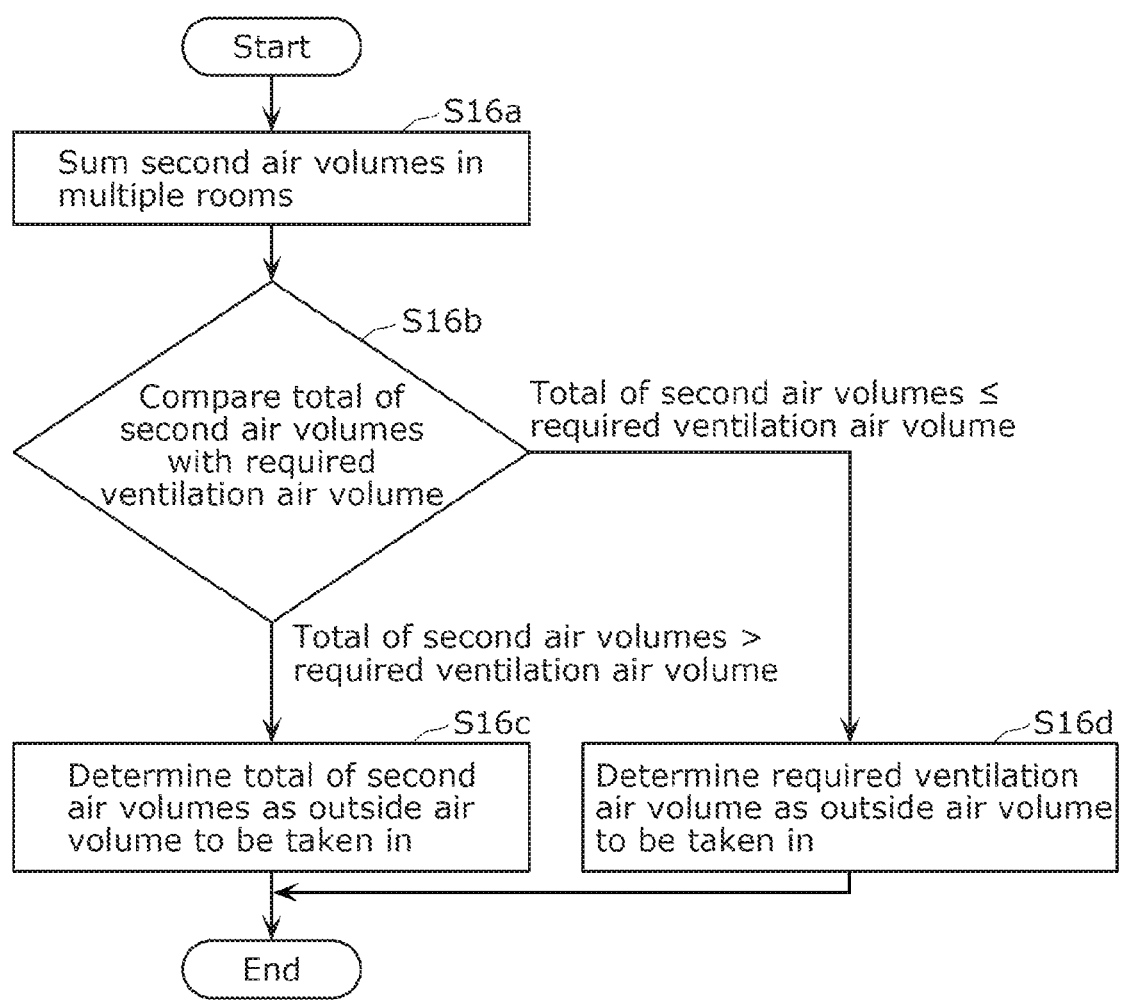
FIG. 4 is a flowchart of processing for determining the amount of outside air to be taken in from outside the facility.

Then, controller 82 performs processing for determining the volume of outside air to be taken in from outside facility 90 (S16). FIG. 4 is a flowchart of the processing for determining the volume of outside air to be taken in from outside facility 90. Controller 82 sums the second air volumes determined for rooms 90a to 90c (S16a) and compares the total of the second air volumes with a legally required ventilation air volume (S16b). When the total of the second air volumes is greater than the required ventilation air volume, controller 82 determines the total of the second air volumes as the volume of outside air to be taken in from outside facility 90 (S16c). When the total of the second air volumes is less than or equal to the required ventilation air volume, controller 82 determines the required ventilation air volume as the volume of outside air to be taken in from outside facility 90 (S16d).

Then, controller 82 performs processing for determining the volume of air to be conveyed to each of rooms 90a to 90c (S17). The details of this determination processing will be described later.

Then, controller 82 controls outside-air intake fan 30 in accordance with the volume of outside air determined in step S16 (S18). Specifically, controller 82 controls outside-air intake fan 30 such that the volume of air determined in step S16 is taken in from outside facility 90 (S18).

Controller 82 also controls conveyor fans 23a (conveyor 23) in accordance with the volume of air to be conveyed, which is determined in step S17 (S19). Controller 82 causes communicator 84 to transmit a control signal to each of conveyor fans 23 so that the volume of air determined in step S17 is conveyed to each room.

Processing for Determining Volume of Air to be Conveyed in Exemplary Operation 1

Figure 5:
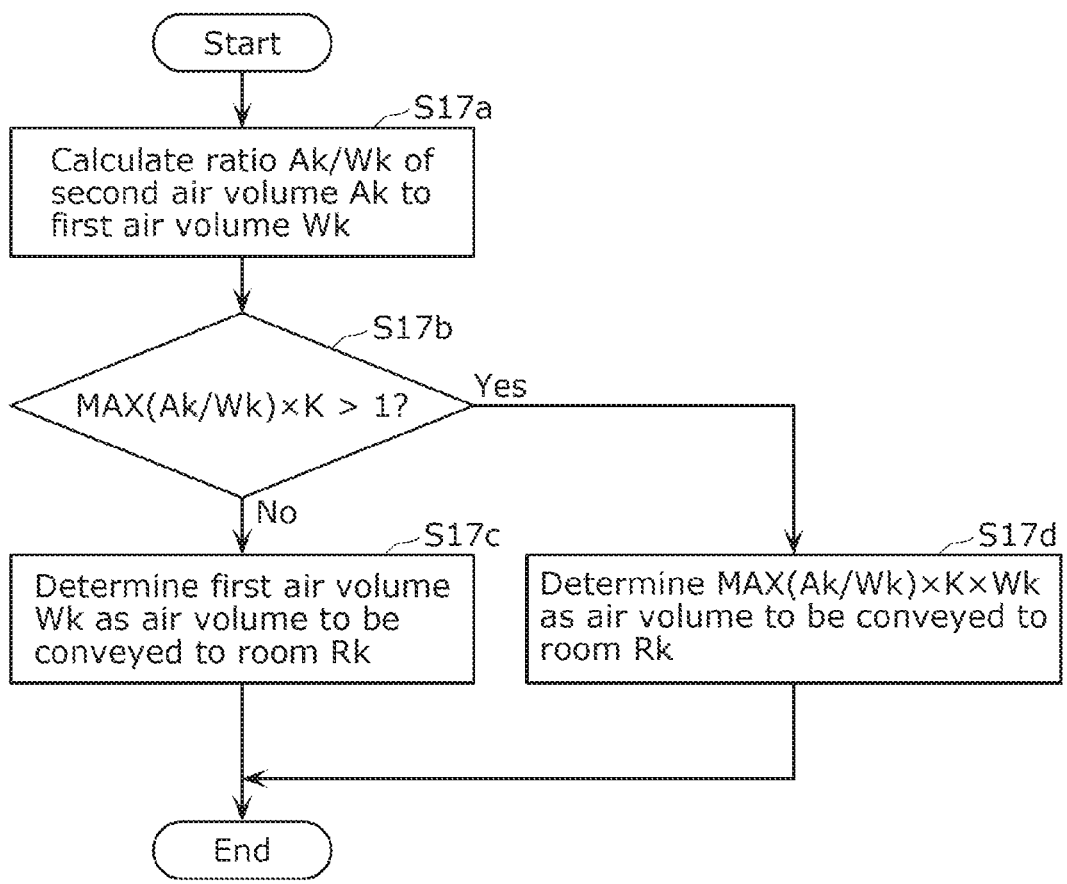
FIG. 5 is a flowchart of processing for determining the amount of air to be conveyed in Exemplary Operation 1.

The details of the processing for determining the volume of air to be conveyed in step S17 will be described. FIG. 5 is a flowchart of the processing for determining the volume of air to be conveyed in Exemplary Operation 1.

A common central air conditioning system causes conveyor 23 to convey air with the first air volume determined for each of rooms 90a to 90c (i.e., the first air volume determined in step S13 described above) to the room in order to make the temperature of the room closer to the set temperature. Such a common central air conditioning system does not control air qualities other than temperature.

In contrast, central air conditioning system 10 achieves both temperature control and a reduction in the concentration of carbon dioxide (improvement in air quality) by using the following method to determine the volume of air to be conveyed to each of rooms 90a to 90c.

First, controller 82 calculates the ratio of the second air volume to the first air volume for each of rooms 90a to 90c (S17a). When each of n rooms is expressed as room Rk (k is a natural number from 1 to n), the ratio of second air volume Ak to first air volume Wk is expressed by Ak/Wk, where Wk is the first air volume determined for room Rk, and Ak is the second air volume determined for room Rk.

Then, controller 82 specifies a maximum value for Ak/Wk and determines whether a value obtained by multiplying specified maximum value MAX(Ak/Wk) by predetermined coefficient K (K is a real number) is greater than one (S17b). To simplify the description, K is assumed to be one.

A case where MAX(Ak/Wk)×K is determined to be less than or equal to one (No in S17b) translates into a case where rooms 90a to 90c do not include a room whose first air volume Wk is less than second air volume Ak. That is, this is the case where all of rooms 90a to 90c have first air volumes Wk greater than second air volumes Ak.

In this case, if air with first air volume Wk is conveyed to room Rk in the same manner as in a common central air conditioning system, naturally, air with second air volume Ak is conveyed to room Rk. As a result, the concentration of carbon dioxide in room Rk is considered to be reduced to a value less than the specified concentration. Therefore, controller 82 determines first air volume Wk as the volume of air to be conveyed to room Rk (S17c).

On the other hand, a case where MAX(Ak/Wk)×K is determined to be greater than one (Yes in S17b) translates into a case where rooms 90a to 90c include room Rk whose first air volume Wk is less than second air volume Ak. For such room Rk, simply conveying air with first air volume Wk is considered insufficient in order to reduce the concentration of carbon dioxide. Therefore, in this case, controller 82 determines MAX(Ak/Wk)×K×Wk as the volume of air to be conveyed to room Rk (S17d).

That is, the volume of air to be conveyed to a first room whose Ak/Wk is the highest (in this case, the first room is also a room whose first air volume Wk is less than second air volume Ak) becomes second air volume Ak (>first air volume Wk) determined for the first room. The volume of air to be conveyed to a second room other than the first room becomes a third air volume (>first air volume Wk) obtained by correcting first air volume Wk determined for the second room. The third air volume, which is the volume of air to be conveyed to second room Rk, is expressed by K×Wk×Am/Wm, where Wm is the first air volume determined for the first room and Am is the second air volume determined for the first room.

In this way, when rooms 90a to 90c include the first room whose first air volume Wk is less than second air volume Ak, air with second air volume Am is conveyed to the first room in order to reduce the concentration of carbon dioxide. Then, air with the third air volume, which is obtained by proportional distribution of the second air volume Am determined for the first room in accordance with the first air volume determined for the second room, is conveyed to the second room other than the first room. That is, central air conditioning system 10 reduces the concentration of carbon dioxide by increasing the volume of air to be conveyed to each of rooms 90a to 90c more than in a common central air conditioning system while maintaining the balance of temperature control among rooms 90a to 90c at the same level as that in the common central air conditioning system.

Through the processing for determining the volume of air to be conveyed as described above, central air conditioning system 10 can achieve both temperature control and a reduction in the concentration of carbon dioxide.

Exemplary Operation 2

Figure 6:
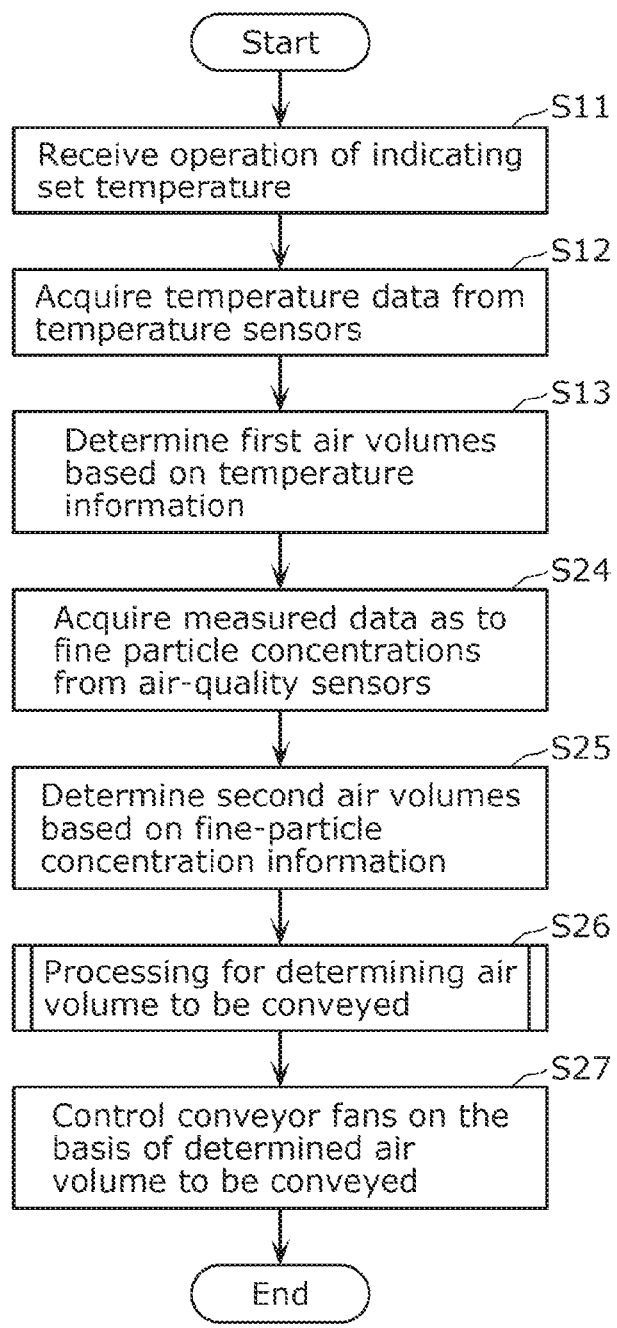
FIG. 6 is a flowchart of Exemplary Operation 2 of the central air conditioning system according to the embodiment.

Next, Exemplary Operation 2 of central air conditioning system 10 will be described. FIG. 6 is a flowchart of Exemplary Operation 2 of central air conditioning system 10. In Exemplary Operation 2, air-quality sensors 70 serve as fine-particle concentration sensors and use fine particle concentration information as air quality information. Central air conditioning system 10 can reduce the concentration of fine particles by circulating indoor air and thereby passing the indoor air through air filter 22.

Steps S11 to S13 are identical to those in Exemplary Operation 1. Subsequent to step S13, communicator 84 acquires measured data indicating the current concentration of fine particles in each of rooms 90a to 90c from air-quality sensor 70 (in Exemplary Operation 2, the fine-particle concentration sensors) provided in the room (S24). The acquired measured data is integrated and stored in storage 83 as fine-particle concentration information indicating the current concentration of fine particles in each of rooms 90a to 90c.

Then, controller 82 determines the second air volume for each of rooms 90a to 90c in accordance with the fine-particle concentration information (S25). The second air volume is the volume of air that has passed through air filter 22 for removal of fine particles and that is to be conveyed to the room in order for the room to satisfy requirements for the concentration of fine particles (to be more specific, requirements that make the concentration of fine particles in the room less than the specified concentration). The second air volume can also be said as the volume of air (the volume of ventilation air) that needs to be exchanged in each of rooms 90a to 90c in order to make the concentration of fine particles less than the specified concentration.

Specifically, controller 82 determines the second air volume for each of rooms 90a to 90c in accordance with room size and the concentration of fine particles in the room. For example, when the concentration of fine particles is less than the specified concentration, the second air volume is determined such that air in the room is exchanged 0.5 times per hour. When the concentration of fine particles is greater than or equal to the specified concentration, the second air volume is determined such that the frequency of air exchange increases with increasing concentration of fine particles (e.g., once per hour, . . . , three times per hour). This method of determining the second air volume is, however, merely one example.

Then, controller 82 performs processing for determining the volume of air to be conveyed to each of rooms 90a to 90c (S26). The details of this determination processing will be described later.

Then, controller 82 controls conveyor fans 23a (conveyor 23) in accordance with the volume of air to be conveyed, which is determined in step S26 (S27). Specifically, controller 82 causes communicator 84 to transmit a control signal to each of conveyor fans 23a so that the volume of air determined in step S26 is conveyed to the room. Controller 82 may further control indoor-air intake fan 40 as necessary.

Processing for Determining Volume of Air to be Conveyed in Exemplary Operation 2

Figure 7:
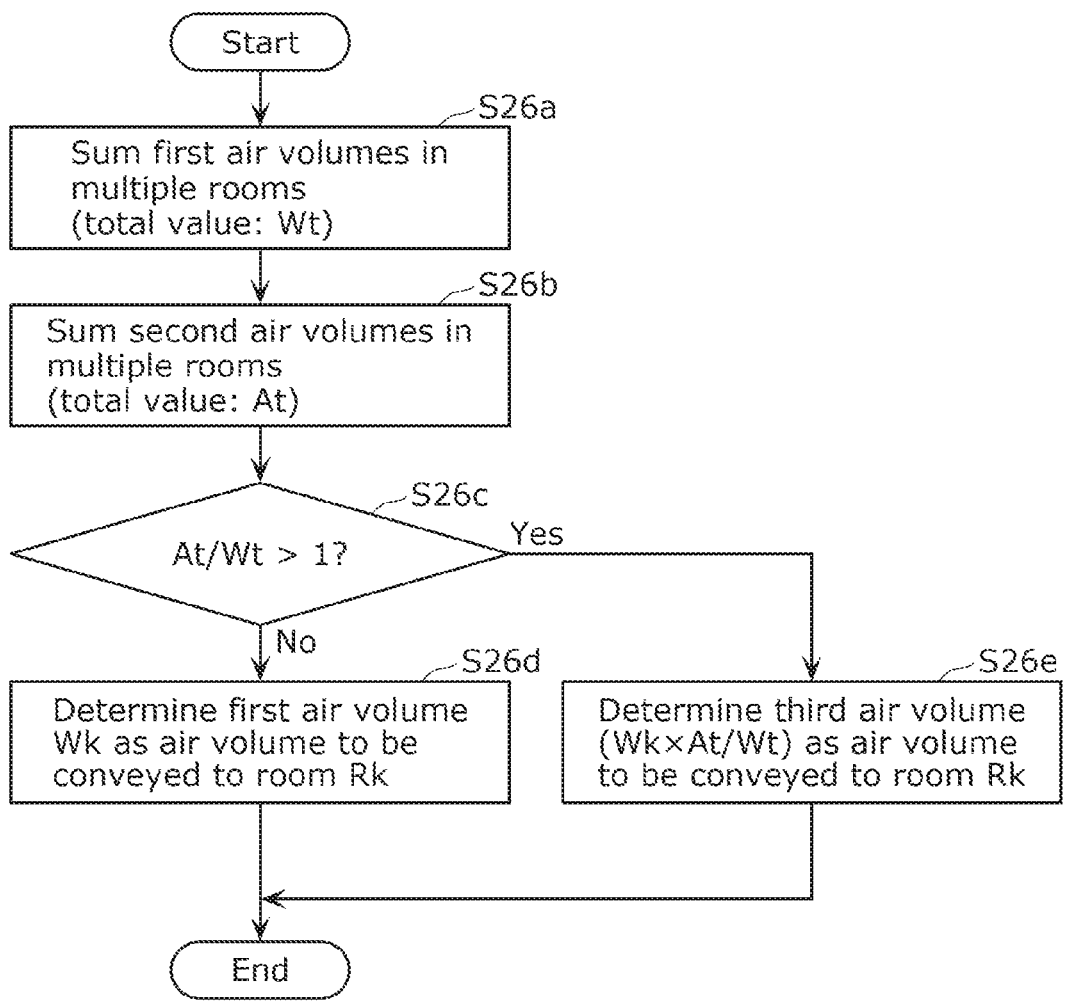
FIG. 7 is a flowchart of processing for determining the amount of air to be conveyed in Exemplary Operation 2.

The details of the processing for determining the volume of air to be conveyed in step S26 will be described. FIG. 7 is a flowchart of the processing for determining the volume of air to be conveyed in Exemplary Operation 2.

First, controller 82 sums the first air volumes determined for rooms 90a to 90c (S26a) and sums the second air volumes determined for rooms 90a to 90c (S26b). Hereinafter, it is assumed that Wk is the first air volume determined for room Rk, Ak is the second air volume determined for room Rk, Wt is the total of first air volumes Wk, and At is the total of second air volumes Ak.

Then, controller 82 determines whether the ratio of the total of first air volumes Wt to the total of second air volumes Ak (i.e., At/Wt) is greater than one (S26c).

When At/Wt is determined to be less than or equal to one (No in S26c), i.e., when total Wt of first air volumes Wk is greater than or equal to total At of second air volumes Ak, it is considered that, if the volume of air with first air volume Wk determined based on temperature is conveyed to room Rk, the indoor air is circulated so as to increase the volume of air passing through air filter 22 and to reduce the concentration of fine particles. In view of this, controller 82 determines first air volume Wk as the volume of air to be conveyed to room Rk (S26d).

On the other hand, when At/Wt is determined to be greater than one (Yes in S26c), i.e., when total Wt of the first air volumes is less than total At of the second air volumes, it is considered that simply conveying the volume of air with first air volume Wk determined based on temperature is insufficient in order to reduce the concentration of fine particles. In view of this, controller 82 determines, as the volume of air to be conveyed to room Rk, a third air volume by multiplying first air volume Wk by At/Wt (>1) (S26e). That is, central air conditioning system 10 reduces the concentration of fine particles by increasing the volume of air to be conveyed to each of rooms 90a to 90c more than in a common central air conditioning system while maintaining the balance of temperature control among rooms 90a to 90c at the same level as that in the common central air conditioning system.

Through the processing for determining the volume of air to be conveyed as described above, central air conditioning system 10 can achieve both temperature control and a reduction in the concentration of fine particles.

Exemplary Operation 3

Figure 8:
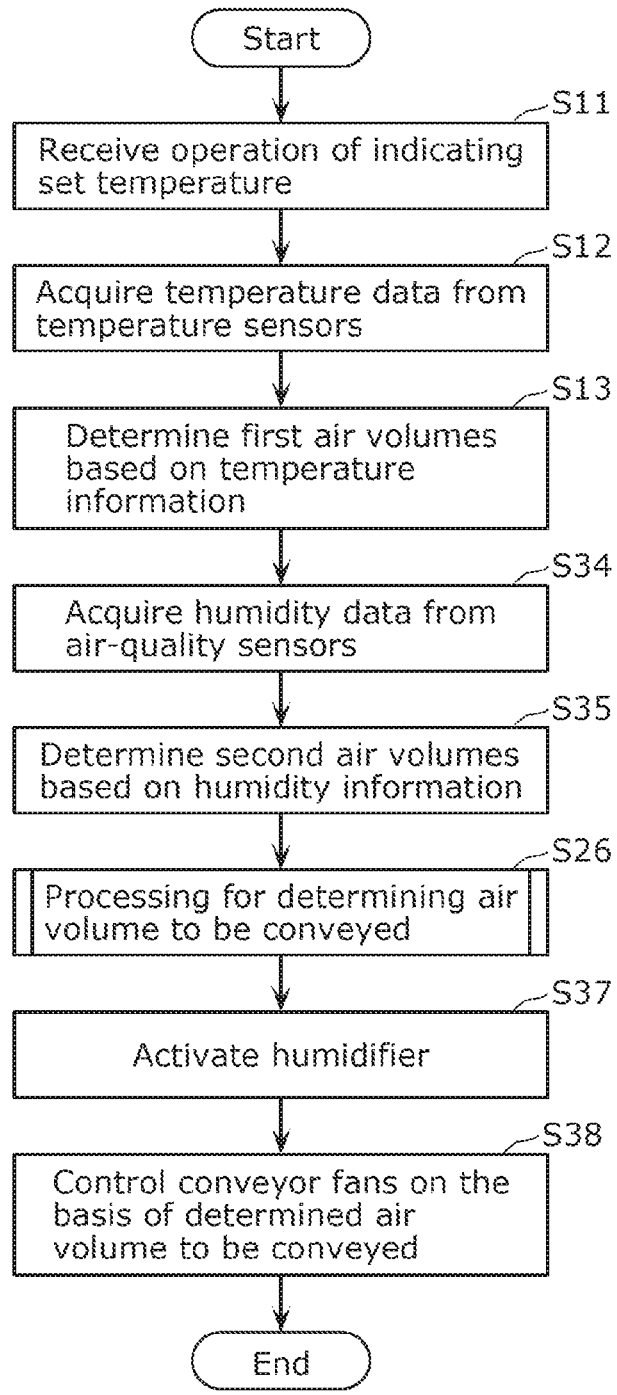
FIG. 8 is a flowchart of Exemplary Operation 3 of the central air conditioning system according to the embodiment.

Next, Exemplary Operation 3 of central air conditioning system 10 will be described. FIG. 8 is a flowchart of Exemplary Operation 3 of central air conditioning system 10. In Exemplary Operation 3, air-quality sensors 70 serve as humidity sensors and use humidity information as air quality information. Exemplary Operation 3 is an operation performed when humidification is necessary due to dry conditions inside facility 90. Central air conditioning system 10 suppresses drying in rooms 90a to 90c by circulating indoor air with sufficient humidity supplied to the inside of facility 90 by humidifier 50.

Steps S11 to S13 are identical to those in Exemplary Operations 1 and 2. Subsequent to step S13, communicator 84 acquires humidity data indicating current humidity in each of rooms 90a to 90c from air-quality sensor 70 (in Exemplary Operation 3, humidity sensor) provided in the room (S34). The acquired humidity data is integrated and stored in storage 83 as humidity information indicating the current humidity in each of rooms 90a to 90c.

Then, controller 82 determines the second air volume for each of rooms 90a to 90c in accordance with the humidity information (S35). The second air volume is the volume of air to be conveyed to the room in order for the room to satisfy requirements for humidity (to be more specific, for example, requirements that make the humidity in the room higher than or equal to target humidity). The second air volume can also be said as the volume of air (the volume of ventilation air) that needs to be exchanged in the room in order to make the humidity in the room higher than or equal to the target humidity.

Specifically, controller 82 determines the second air volume for each of rooms 90a to 90c in accordance with room size and the humidity in the room. For example, when the humidity is higher than or equal to the target humidity, the second air volume is determined such that air in the room is exchanged 0.5 times per hour. When the humidity is less than the target humidity, the second air volume is determined such that the frequency of air exchange increases with increasing humidity (e.g., once per hour, . . . , or three times per hour). This method of determining the second air volume is, however, merely one example.

Then, controller 82 performs processing for determining the volume of air to be conveyed to each of rooms 90a to 90c (S26). This determination processing is identical to that in Exemplary Operation 2.

Then, controller 82 actuates humidifier 50 (S37) and controls conveyor fans 23a (conveyor 23) in accordance with the volume of air to be conveyed, which is determined in step S26 (S38). Specifically, controller 82 causes communicator 84 to transmit a control signal to each of conveyor fans 23a so that air with the volume determined in step S26 is conveyed to the room. Controller 82 may further control indoor-air intake fan 40 as necessary.

Central air conditioning system 10 as described above can achieve both temperature control and humidification.

Variation 1

Figure 9:
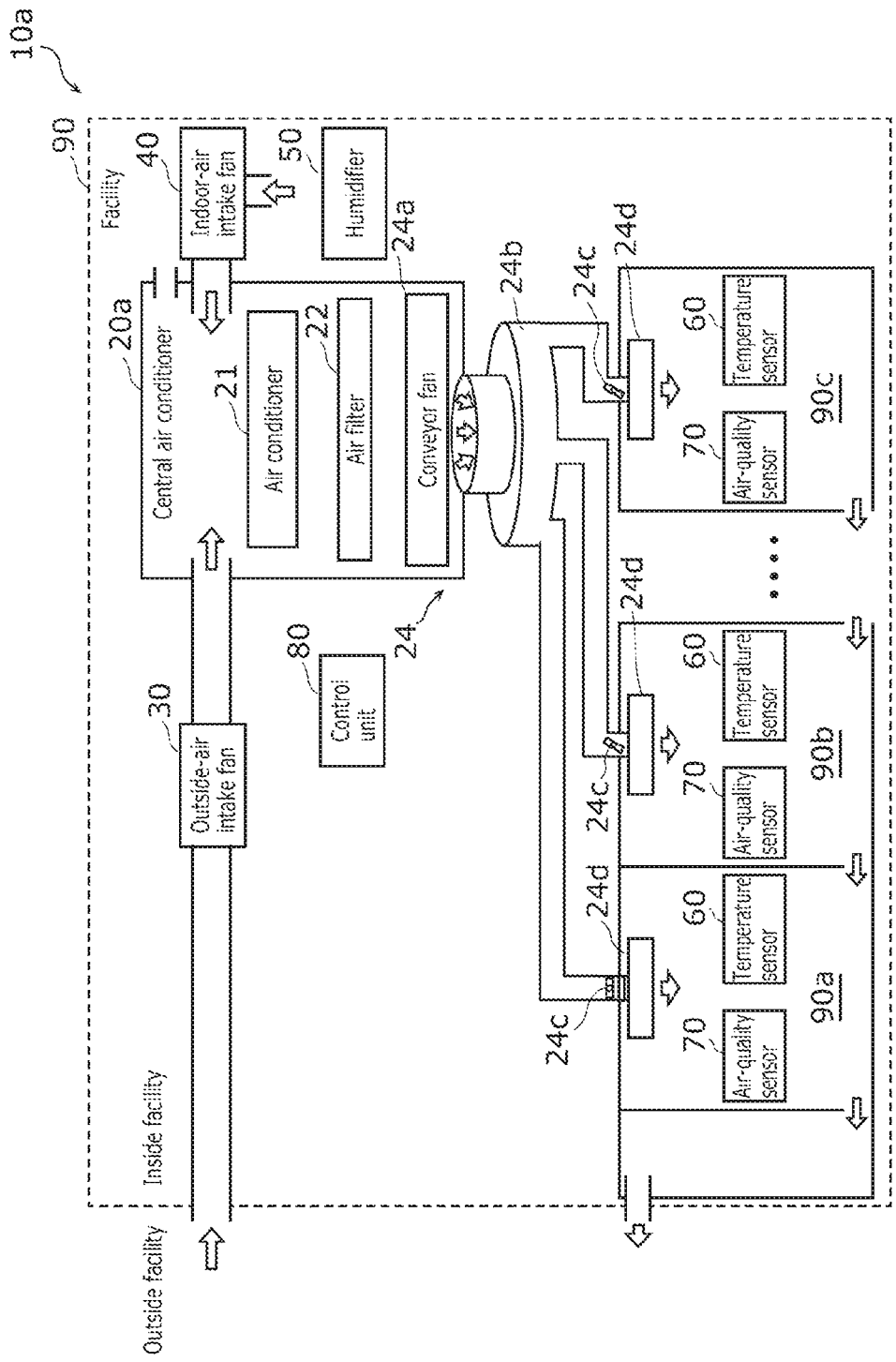
FIG. 9 is a diagram illustrating a schematic configuration of a central air conditioning system according to Variation 1.

Hereinafter, a configuration of a central air conditioning system according to Variation 1 will be described. FIG. 9 is a diagram illustrating a schematic configuration of the central air conditioning system according to Variation 1.

As illustrated in FIG. 9, central air conditioning system 10a includes central air conditioner 20a, instead of central air conditioner 20. Central air conditioner 20a includes air conditioner 21, air filter 22, and conveyor 24.

Conveyor 24 conveys air (outside air or indoor air) that has undergone temperature control by air conditioner 21 and that has passed through air filter 22, to each of rooms 90a to 90c under the control of control device 80. Conveyor 24 includes conveyor fan 24a, branch chamber 24b, a plurality of variable air volume (VAV) dampers 24c, and a plurality of vent holes 24d. Conveyor 24 includes one set of VAV damper 24c and vent hole 24d for each room.

In conveyor 24, branch chamber 24b includes a plurality of air conveyance paths that are branched into each of rooms 90a to 90c. VAV dampers 24c are provided for each of the air conveyance paths included in branch chamber 24b.

Central air conditioning system 10a described above, like central air conditioning system 10, can perform operations including Exemplary Operations 1 to 3 described above. Specifically, control device 80 of central air conditioning system 10a is capable of conveying air with a determined volume to each of rooms 90a to 90c by controlling conveyor fans 24a and VAV dampers 24c in step S19 of Exemplary Operation 1 described above, in step S27 of step S19, Exemplary Operation 2 described above, and in step S38 of Exemplary Operation 3 described above.

Variation 2

Figure 10:
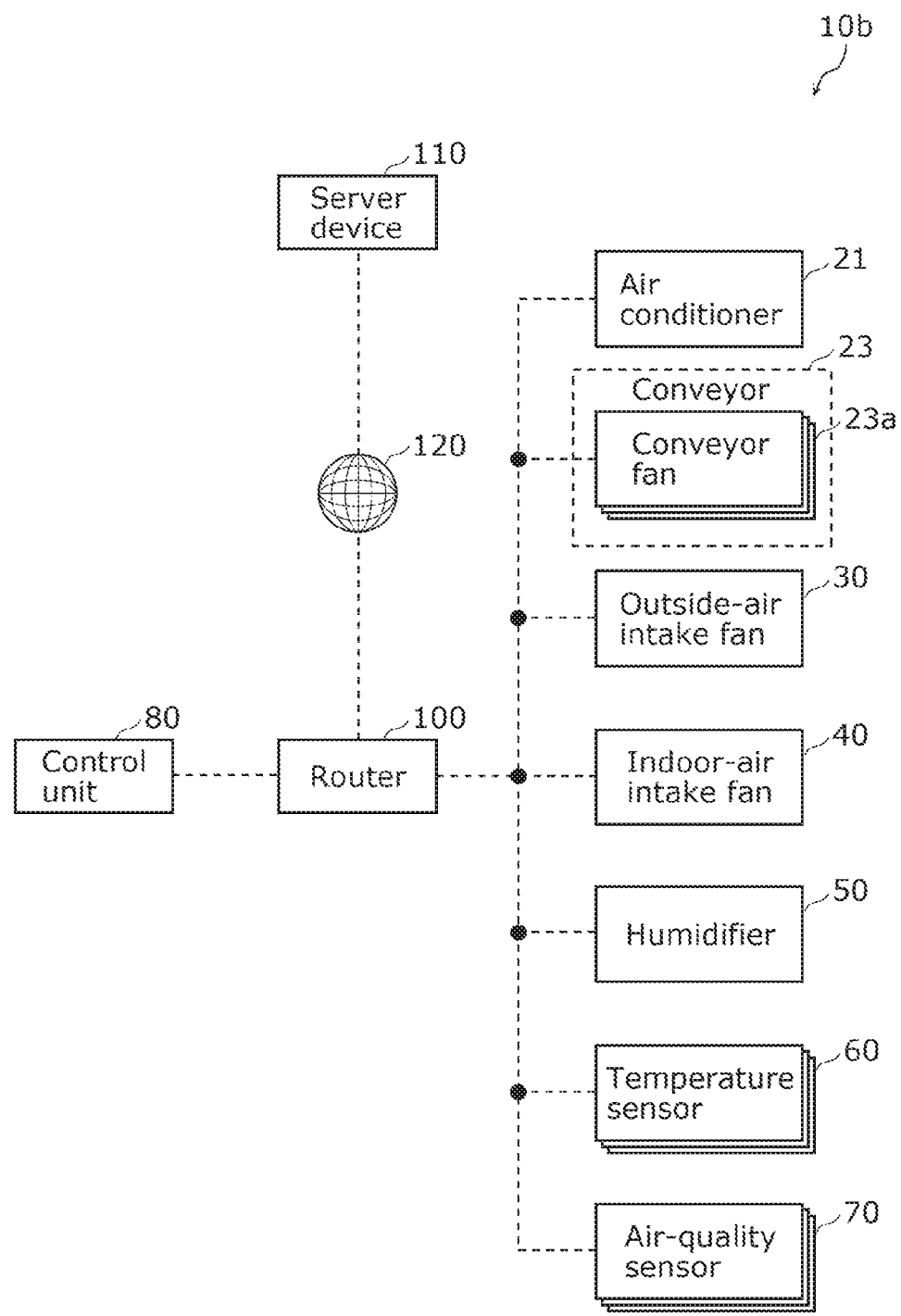
FIG. 10 is a block diagram illustrating a functional configuration of a central air conditioning system according to Variation 2.

Central air conditioning system 10 may also be implemented as a client server system. FIG. 10 is a block diagram illustrating a functional configuration of a central air conditioning system according to Variation 2.

As illustrated in FIG. 10, central air conditioning system 10b includes air conditioner 21 and conveyor 23 (i.e., central air conditioner 20), outside-air intake fan 30, indoor-air intake fan 40, humidifier 50, a plurality of temperature sensors 60, a plurality of air-quality sensors 70, control device 80, router 100, and server device 110.

In central air conditioning system 10b, air conditioner 21, conveyor 23, outside-air intake fan 30, indoor-air intake fan 40, humidifier 50, temperature sensors 60, air-quality sensors 70, and control device 80 are each connectable to wide-area communication network 120 such as the Internet via router 100. Specifically, air conditioner 21, conveyor 23, outside-air intake fan 30, indoor-air intake fan 40, humidifier 50, temperature sensors 60, air-quality sensors 70, and control device 80 are each capable of communication with server device 110 via router 100. Server device 110 is a cloud server provided outside facility 90.

In central air conditioning system 10b described above, server device 110 may execute part or all of the processing performed by control device 80 in Exemplary Operations 1 to 3. Although central air conditioning system 10b is configured by adding server device 110 to central air conditioning system 10, the present invention may be implemented as a client server system that is configured by adding server device 110 to central air conditioning system 10a according to Variation 1.

Variation 3

Figure 11:
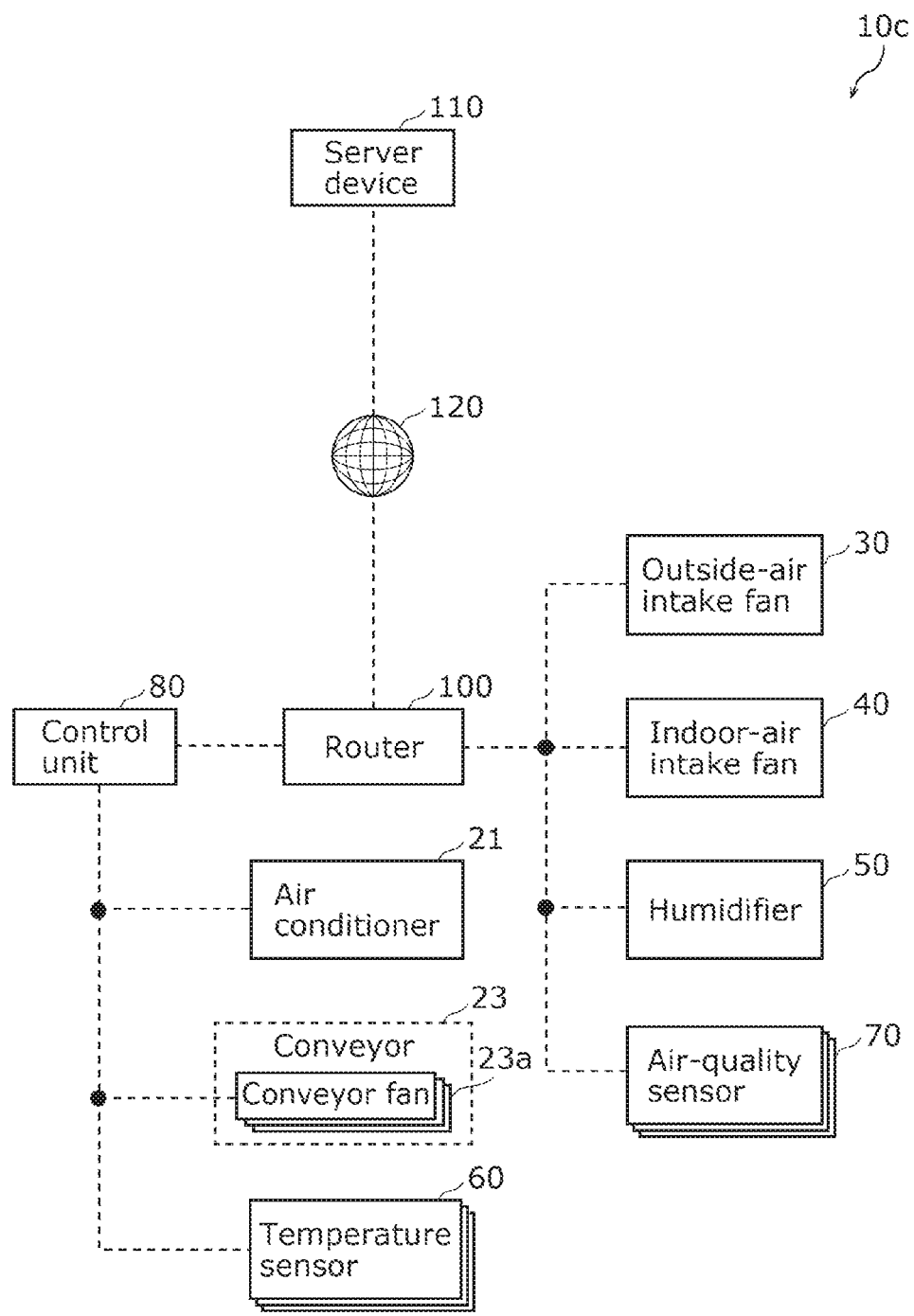
FIG. 11 is a block diagram illustrating a functional configuration of a central air conditioning system according to Variation 3.

Central air conditioning system 10 may be implemented as a client server system that is assumed to be obtained by adding devices to a common central air conditioning system. FIG. 11 is a block diagram illustrating a functional configuration of such a central air conditioning system according to Variation 3.

As illustrated in FIG. 11, central air conditioning system 10c includes air conditioner 21 and conveyor 23 (i.e., central air conditioner 20), outside-air intake fan 30, indoor-air intake fan 40, humidifier 50, a plurality of temperature sensors 60, a plurality of air-quality sensors 70, control device 80, router 100, and server device 110.

In central air conditioning system 10c, outside-air intake fan 30, indoor-air intake fan 40, humidifier 50, air-quality sensors 70, and control device 80 are each connectable to wide-area communication network 120 such as the Internet via router 100. Specifically, outside-air intake fan 30, indoor-air intake fan 40, humidifier 50, air-quality sensors 70, and control device 80 are each capable of communication with server device 110 via router 100. Server device 110 is a cloud server provided outside facility 90.

Meanwhile, air conditioner 21, conveyor 23, and temperature sensors 60 are connected to control device 80 via a local communication network as in central air conditioning system 10. The configuration in which air conditioner 21, conveyor 23, and temperature sensors 60 are connected to control device 80 via a local communication network is often seen in a common (already-existing) central air conditioning system. In central air conditioning system 10c, outside-air intake fan 30, indoor-air intake fan 40, humidifier 50, and some of air-quality sensors 70 may be connected to control device 80 via a local communication network.

Central air conditioning system 10c described above can be realized with ease by adding constituent elements such as air-quality sensors 70 to an already-existing central air conditioning system at a later time. That is, central air conditioning system 10c can readily realize functional expansion of an already-existing central air conditioning system. In central air conditioning system 10c, server device 110 may execute some or all of the processing performed by control device 80 in Exemplary Operations 1 to 3. The present invention may be implemented as a system that is obtained by modifying central air conditioning system 10a according to Variation 1 in the same manner as central air conditioning system 10c.

Advantageous Effects

As described above, central air conditioning system 10 includes air conditioner 21, conveyor 23 that conveys air that has undergone temperature control by the air conditioner to each of rooms 90a to 90c in facility 90, and control device 80. In Exemplary Operation 1, control device 80 (or the method of controlling central air conditioning system 10) determines the first air volume for each of rooms 90a to 90c in accordance with the temperature information indicating the temperature of the room, the first air volume being the volume of air to be conveyed to the room in order for the room to satisfy requirements for temperature; determines the second air volume for each of rooms 90a to 90c in accordance with the air quality information indicating the air quality in the room, the second air volume being the volume of air to be conveyed to the room in order for the room to satisfy requirements for air quality; when rooms 90a to 90c do not include the first room whose first air volume is less than the second air volume, causes conveyor 23 to convey air with the first air volume determined for each of rooms 90a to 90c to the room; and when rooms 90a to 90c include the first room, causes conveyor 23 to (1) convey air with the second air volume determined for the first room to the first room and (2) convey air with a third air volume to a second room other than the first room and included in rooms 90a to 90, the third air volume being obtained by correcting the first air volume determined for the second room.

Central air conditioning system 10 and the control method for the same described above achieve both temperature control and air quality control.

For example, the third air volume is expressed by Wk×Am/Wm, where Wm is the first air volume determined for the first room, Am is the second air volume determined for the first room, and Wk is the first air volume determined for the second room.

Central air conditioning system 10 and the control method for the same enable controlling air quality by increasing the volume of air to be conveyed to each of rooms 90a to 90c more than in a common central air conditioning system while maintaining the balance of temperature control among rooms 90a to 90c at the same level as that in the common central air conditioning system.

The air quality information indicates, for example, the concentration of carbon dioxide in each of rooms 90a to 90c, and conveyor 23 conveys air that has been taken in from outside facility 90 and that has undergone temperature control by air conditioner 21, to each of rooms 90a to 90c.

Central air conditioning system 10 and the control method for the same achieve both temperature control and control of the concentration of carbon dioxide.

In Exemplary Operation 2 or 3, control device 80 (or the method of controlling central air conditioning system 10) determines the first air volume for each of rooms 90a to 90c in accordance with the temperature information indicating the temperature of the room, the first air volume being the volume of air to be conveyed to the room in order for the room to satisfy requirements for temperature; determines the second air volume for each of rooms 90a to 90c in accordance with the air quality information indicating the air quality in the room, the second air volume being the volume of air to be conveyed to the room in order for the room to satisfy requirements for air quality; and when the total of the first air volumes is greater than or equal to the total of the second air volumes, causes conveyor 23 to convey air with the first air volume determined for each of rooms 90a to 90c to the room; and when the total of the first air volumes is less than the total of the second air volumes, causes conveyor 23 to convey air with the third air volume to each of rooms 90a to 90c, the third air volume being obtained by correcting the first air volume determined for the room.

Central air conditioning system 10 and the control method for the same described above achieve both temperature control and air quality control.

For example, the third air volume determined for one room included in rooms 90a to 90c is expressed by Wk×At/Wt, where Wt is the total of the first air volumes, At is the total of the second air volumes, and Wk is the first air volume determined for the one room.

Central air conditioning system 10 and the control method for the same described above enable controlling air quality by increasing the volume of air to be conveyed to each of rooms 90a to 90c more than in a common central air conditioning system while maintaining the balance of temperature control among rooms 90a to 90c at the same level as that in the common central air conditioning system.

In Exemplary Operation 2, the air quality information indicates the concentration of fine particles in each of rooms 90a to 90c, and central air conditioning system 10 further includes air filter 22. Conveyor 23 conveys air that has been taken in from inside facility 90 and that has undergone temperature control by air conditioner 21, to each of rooms 90a to 90c via air filter 22.

Central air conditioning system 10 and the control method for the same described above achieve both temperature control and control of the concentration of fine particles.

In Exemplary Operation 3, the air quality information indicates the humidity in each of rooms 90a to 90c, and central air conditioning system 10 further includes humidifier 50. Conveyor 23 conveys, to each of rooms 90a to 90c, air that has been taken in from inside facility 90 and that has undergone temperature control by air conditioner 21 and humidification by humidifier 50.

Central air conditioning system 10 and the control method for the same described above achieve both temperature control and humidity control (in particular, humidification).

Other Embodiments

Although one embodiment has been described thus far, the present invention is not intended to be limited to the above-described embodiment.

For example, the processing for determining the volume of air to be conveyed according to Exemplary Operation 1 may be used to control the humidity or the concentration of fine particles, or may be used to control the concentration of any other gas. Examples of the concentration of any other gas include the concentration of total volatile organic compounds (TVOC), the concentration of nitrogen oxide ($NO_x$), the concentration of sulfur oxide ($SO_x$), and the concentration of ozone ($O_3$). Similarly, the processing for determining the volume of air to be conveyed according to Exemplary Operation 2 may be used to control the concentration of carbon dioxide, or may be used to control the concentration of any other gas.

In the above-described embodiment, the processing executed by a specific processing unit may be executed by any other processing unit.

There are no particular limitations on the method of communication between devices in the above-described embodiment. Wireless communication may be provided between devices, or cable communication may be provided between devices. As another alternative, a combination of wireless communication and cable communication may be provided between devices. In the case where two devices communicate with each other in the above-described embodiment, a relay device that is not shown may be interposed between the two devices.

The sequence of processes described in each flowchart according to the above-described embodiment is merely one example. The sequence of a plurality of processes may be modified, or a plurality of processes may be executed in parallel.

In the above-described embodiment, each constituent element may be implemented by executing a software program suitable for the constituent element. Each constituent element may also be implemented by a program executor such as a CPU or a processor that reads and executes a software program recorded on a recording medium such as a hard disk or a semiconductor memory.

Each constituent element may be implemented by hardware. For example, each constituent element may be a circuit (or an integrated circuit). These circuits may configure a single circuit as a whole, or each circuit may be a different circuit. These circuits may be general-purpose circuits, or may be dedicated circuits.

It is to be noted that general or specific aspects of the present invention may be realized by a system, a device, a method, an integrated circuit, a computer program, or a computer-readable recording medium such as a CD-ROM, or may be realized by any combination of a system, a device, a method, an integrated circuit, a computer program, and a recording medium.

For example, the present invention may be realized as a method of controlling a central air conditioning system to be executed by a computer, or may be realized as a program for causing a computer to execute such a control method. The present invention may also be realized as a non-transitory computer-readable recording medium that records such a program.

In the above-described embodiment, the central air conditioning system is realized by a plurality of devices, but the air conditioning system may be realized by a single device. For example, the central air conditioning system may be realized by a single device that corresponds to a control device, or may be realized by a single device that corresponds to a server device. In the case where the central air conditioning system is realized by a plurality of devices, the constituent elements of the central air conditioning system may be divided in any way into the devices.

The present invention also includes other variations such as embodiments obtained by applying various modifications conceivable by those skilled in the art to each embodiment, and embodiments implemented by any combination of constituent elements and functions of each embodiment without departing from the scope of the present invention.

REFERENCE SIGNS LIST 10, 10a, 10b, 10c central air conditioning system
21 air conditioner
22 air filter
23, 24 conveyor
50 humidifier
80 control device
90 facility
90a, 90b, 90c room

The invention claimed is:

1. A method of controlling an air conditioning system, the air conditioning system including:
an air conditioner; and
a conveyor that conveys air that has undergone temperature control by the air conditioner, to each of a plurality of rooms in a facility, wherein the conveyor comprises a plurality of sets of conveyor fans, ducts and vent holes, a corresponding one of the sets being provided for each of the plurality of rooms,
the method comprising:
individually determining a first air volume for each of the plurality of rooms in accordance with temperature information indicating a temperature of each of the plurality of rooms, the first air volume being a volume of air to be conveyed to each of the plurality of rooms in order for each of the plurality of rooms to satisfy a requirement for temperature;
individually determining a second air volume for each of the plurality of rooms in accordance with air quality information indicating air quality in each of the plurality of rooms, the second air volume being a volume of air to be conveyed to each of the plurality of rooms in order for each of the plurality of rooms to satisfy a requirement for air quality;
when the plurality of rooms do not include a first room whose first air volume is less than the second air volume, causing the conveyor to convey air with the first air volume determined for each of the plurality of rooms, to each of the plurality of rooms; and
when the plurality of rooms include the first room, causing the conveyor to convey air with a third air volume to each of the plurality of rooms,
wherein the third air volume is expressed by K×Wk×Am/Wm, where Wm is the first air volume determined for the first room, Am is the second air volume determined for the first room, the first room has a highest ratio of the second air volume to the first air volume, Wk is the first air volume determined for each of the plurality of rooms, and K is a predetermined coefficient.

2. The method of controlling an air conditioning system according to claim 1,
wherein the air quality information indicates a concentration of carbon dioxide in each of the plurality of rooms, and
the conveyor conveys, to each of the plurality of rooms, air that has been taken in from outside the facility and that has undergone temperature control by the air conditioner.

3. A method of controlling an air conditioning system, the air conditioning system including:
an air conditioner; and
a conveyor that conveys air that has undergone temperature control by the air conditioner, to each of a plurality of rooms in a facility, wherein the conveyor comprises a plurality of sets of conveyor fans, ducts and vent holes, a corresponding one of the sets being provided for each of the plurality of rooms,
the method comprising:
individually determining a first air volume for each of the plurality of rooms in accordance with temperature information indicating a temperature of each of the plurality of rooms, the first air volume being a volume of air to be conveyed to each of the plurality of rooms in order for each of the plurality of rooms to satisfy a requirement for temperature;
individually determining a second air volume for each of the plurality of rooms in accordance with air quality information indicating air quality in each of the plurality of rooms, the second air volume being a volume of air to be conveyed to each of the plurality of rooms in order for each of the plurality of rooms to satisfy a requirement for air quality;
when a total of the first air volumes is greater than or equal to a total of the second air volumes, causing the conveyor to convey air with the first air volume determined for each of the plurality of rooms, to each of the plurality of rooms; and when the total of the first air volumes is less than the total of the second air volumes, causing the conveyor to convey air with a third air volume to each of the plurality of rooms.

4. The method of controlling an air conditioning system according to claim 3,
wherein the third air volume determined for one room included in the plurality of rooms is expressed by Wk×At/Wt, where Wt is the total of the first air volumes, At is the total of the second air volumes, and Wk is the first air volume determined for the one room.

5. The method of controlling an air conditioning system according to claim 4,
wherein the air quality information indicates a concentration of fine particles in each of the plurality of rooms, the air conditioning system further includes an air filter, and
the conveyor conveys air that has been taken in from inside the facility and that has undergone temperature control by the air conditioner, to each of the plurality of rooms via the air filter.

6. The method of controlling an air conditioning system according to claim 4,
wherein the air quality information indicates humidity in each of the plurality of rooms,
the air conditioning system further includes a humidifier, and
the conveyor conveys, to each of the plurality of rooms, air that has been taken in from inside the facility and that has undergone temperature control by the air conditioner and humidification by the humidifier.

7. A non-transitory computer-readable recording medium for use in a computer, the recording medium having a computer program recorded thereon for causing the computer to execute the method of controlling an air conditioning system according to claim 1.

8. An air conditioning system comprising:
an air conditioner;
a conveyor that conveys air that has undergone temperature control by the air conditioner, to each of a plurality of rooms in a facility, wherein the conveyor comprises a plurality of sets of conveyor fans, ducts and vent holes, a corresponding one of the sets being provided for each of the plurality of rooms; and
a control device,
wherein the control device:
individually determines a first air volume for each of the plurality of rooms in accordance with temperature information indicating a temperature of each of the plurality of rooms, the first air volume being a volume of air to be conveyed to each of the plurality of rooms in order for each of the plurality of rooms to satisfy a requirement for temperature;
individually determines a second air volume for each of the plurality of rooms in accordance with air quality information indicating air quality in each of the plurality of rooms, the second air volume being a volume of air to be conveyed to each of the plurality of rooms in order for each of the plurality of rooms to satisfy a requirement for air quality;
when the plurality of rooms do not include a first room whose first air volume is less than the second air volume, causes the conveyor to convey air with the first air volume determined for each of the plurality of rooms to each of the plurality of rooms; and when the plurality of rooms include the first room, causes the conveyor to convey air with a third air volume to each of the plurality of rooms,
wherein the third air volume is expressed by K×Wk×Am/Wm, where Wm is the first air volume determined for the first room, Am is the second air volume determined for the first room, the first room has a highest ratio of the second air volume to the first air volume, Wk is the first air volume determined for each of the plurality of rooms, and K is a predetermined coefficient.

9. An air conditioning system comprising:
an air conditioner;
a conveyor that conveys air that has undergone temperature control by the air conditioner, to each of a plurality of rooms in a facility, wherein the conveyor comprises a plurality of sets of conveyor fans, ducts and vent holes, a corresponding one of the sets being provided for each of the plurality of rooms; and
a control device,
wherein the control device:
individually determines a first air volume for each of the plurality of rooms in accordance with temperature information indicating a temperature of each of the plurality of rooms, the first air volume being a volume of air to be conveyed to each of the plurality of rooms in order for each of the plurality of rooms to satisfy a requirement for temperature;
individually determines a second air volume for each of the plurality of rooms in accordance with air quality information indicating air quality in each of the plurality of rooms, the second air volume being a volume of air to be conveyed to each of the plurality of rooms in order for each of the plurality of rooms to satisfy a requirement for air quality;
when a total of the first air volumes is greater than or equal to a total of the second air volumes, causes the conveyor to convey air with the first air volume determined for each of the plurality of rooms to each of the plurality of rooms; and
when the total of the first air volumes is less than the total of the second air volume, causes the conveyor to convey air with a third air volume to each of the plurality of rooms, the third air volume being obtained by correcting the first air volume determined for the room.

10. The method of controlling an air conditioning system according to claim 1,
wherein the plurality of rooms include a plurality of first rooms, each being the first room, and
when one of the plurality of first rooms whose value obtained by dividing the second air volume by the first air volume is the greatest is regarded as a target room,
Wm is the first air volume determined for the target room, and
Am is the second air volume determined for the target room.

11. The air conditioning system according to claim 9,
wherein the third air volume determined for one room included in the plurality of rooms is expressed by Wk×At/Wt, where Wt is the total of the first air volumes, At is the total of the second air volumes, and Wk is the first air volume determined for the one room.

* * * * *